(12) United States Patent
Nanda

(10) Patent No.: US 8,578,230 B2
(45) Date of Patent: Nov. 5, 2013

(54) ENHANCED BLOCK ACKNOWLEDGEMENT

(75) Inventor: Sanjiv Nanda, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 12/976,641

(22) Filed: Dec. 22, 2010

(65) Prior Publication Data

US 2011/0154144 A1 Jun. 23, 2011

Related U.S. Application Data

(62) Division of application No. 11/237,413, filed on Sep. 27, 2005, now Pat. No. 7,882,412.

(60) Provisional application No. 60/616,335, filed on Oct. 5, 2004.

(51) Int. Cl.
*H04L 1/18* (2006.01)
*G08C 25/02* (2006.01)

(52) U.S. Cl.
USPC ............ 714/748; 714/749; 714/750; 714/751

(58) Field of Classification Search
USPC .................................................. 714/748–751
See application file for complete search history.

(56) References Cited

U.S. PATENT DOCUMENTS

| | | | |
|---|---|---|---|
| 4,750,171 A | 6/1988 | Kedar et al. | |
| 4,901,313 A * | 2/1990 | Fujikura et al. | 370/324 |
| 5,133,081 A | 7/1992 | Mayo | |
| 5,276,703 A | 1/1994 | Budin et al. | |
| 5,297,144 A | 3/1994 | Gilbert et al. | |
| 5,371,734 A | 12/1994 | Fischer | |
| 5,384,777 A | 1/1995 | Ahmadi et al. | |
| 5,444,702 A | 8/1995 | Burnett et al. | |

(Continued)

FOREIGN PATENT DOCUMENTS

| CN | 1272270 A | 11/2000 |
|---|---|---|
| EP | 0475682 A2 | 3/1992 |

(Continued)

OTHER PUBLICATIONS

3GPP TS 25.213 V6.0.0 (Dec. 2003): 3rd Generation Partnership Project; Technical Specification Group Radio Access Network; Spreading and modulation (FDD)(Release 6).

(Continued)

*Primary Examiner* — Guy Lamarre
(74) *Attorney, Agent, or Firm* — Charles E. Eggers

(57) ABSTRACT

Embodiments disclosed herein address the need in the art for enhanced block acknowledgement. In one embodiment, a receiver indicates a decoding delay for a maximum size aggregate frame in Block Ack negotiation, which may be used by a transmitter to determine to which Block Ack Request a Block Acknowledgement is responsive. In another embodiment, a Transmission Sequence Number (TSN) may be included in a Block Ack Request. The receiver includes the TSN in the corresponding Block Ack response. This allows the transmitter to determine which frames are "in transit." The TSN may be used to identify blocks. In another embodiment, a TSN may be associated with one or more transmitted frames. While, the TSN is not transmitted with the Block Ack Request, the transmitter may determine which TSN corresponds with a Block Ack response in accordance with acknowledgements contained therein. Combinations of these techniques may be deployed. Various other aspects are also presented.

32 Claims, 12 Drawing Sheets

(56) References Cited

U.S. PATENT DOCUMENTS

| | | |
|---|---|---|
| 5,537,416 A | 7/1996 | MacDonald et al. |
| 5,638,371 A | 6/1997 | Raychaudhuri et al. |
| 5,677,909 A | 10/1997 | Heide |
| 5,729,542 A | 3/1998 | Dupont |
| 5,818,842 A | 10/1998 | Burwell et al. |
| 5,872,777 A | 2/1999 | Brailean et al. |
| 5,970,059 A | 10/1999 | Ahopelto et al. |
| 6,002,691 A | 12/1999 | Citta et al. |
| 6,011,796 A | 1/2000 | Rezaiifar et al. |
| 6,111,927 A | 8/2000 | Sokoler |
| 6,128,283 A | 10/2000 | Sabaa et al. |
| 6,256,317 B1 | 7/2001 | Holloway et al. |
| 6,367,045 B1 | 4/2002 | Khan et al. |
| 6,404,751 B1 | 6/2002 | Roark et al. |
| 6,438,603 B1 | 8/2002 | Ogus |
| 6,504,506 B1 | 1/2003 | Thomas et al. |
| 6,512,773 B1 | 1/2003 | Scott |
| 6,532,225 B1 | 3/2003 | Chang et al. |
| 6,563,816 B1 | 5/2003 | Nodoushani et al. |
| 6,580,704 B1 | 6/2003 | Wellig et al. |
| 6,587,441 B1 | 7/2003 | Urban et al. |
| 6,611,525 B1 | 8/2003 | Natanson et al. |
| 6,611,529 B1 | 8/2003 | Krishnakumar et al. |
| 6,625,171 B1 | 9/2003 | Matsudo |
| 6,633,564 B1 | 10/2003 | Steer et al. |
| 6,724,740 B1 | 4/2004 | Choi et al. |
| 6,741,635 B2 | 5/2004 | Lo et al. |
| 6,751,187 B2 | 6/2004 | Walton et al. |
| 6,760,388 B2 | 7/2004 | Ketchum et al. |
| 6,768,730 B1 | 7/2004 | Whitehill |
| 6,771,706 B2 | 8/2004 | Ling et al. |
| 6,791,962 B2 | 9/2004 | Wentink |
| 6,795,409 B1 | 9/2004 | Youssefmir et al. |
| 6,795,419 B2 | 9/2004 | Parantainen et al. |
| 6,813,260 B1 | 11/2004 | Fogle |
| 6,868,133 B2 | 3/2005 | Hicks et al. |
| 6,895,010 B1 * | 5/2005 | Chang et al. .................. 370/394 |
| 6,912,225 B1 | 6/2005 | Kohzuki et al. |
| 6,944,688 B1 | 9/2005 | Batcher |
| 6,977,944 B2 | 12/2005 | Brockmann et al. |
| 7,065,144 B2 | 6/2006 | Walton et al. |
| 7,082,117 B2 | 7/2006 | Billhartz |
| 7,085,281 B2 | 8/2006 | Thomas et al. |
| 7,095,732 B1 | 8/2006 | Watson, Jr. |
| 7,099,300 B2 | 8/2006 | Sugaya |
| 7,123,627 B2 | 10/2006 | Kowalski |
| 7,130,289 B2 | 10/2006 | Kuan et al. |
| 7,154,876 B2 | 12/2006 | Benveniste |
| 7,187,691 B2 | 3/2007 | Gavette |
| 7,203,192 B2 | 4/2007 | Desai et al. |
| 7,263,083 B2 | 8/2007 | Kisigami et al. |
| 7,266,087 B2 | 9/2007 | Wahl |
| 7,274,707 B2 | 9/2007 | Choi et al. |
| 7,277,419 B2 | 10/2007 | McGowan |
| 7,277,430 B2 | 10/2007 | Ono et al. |
| 7,284,260 B2 | 10/2007 | Hilts et al. |
| 7,301,924 B1 | 11/2007 | Gurbuz et al. |
| 7,301,944 B1 | 11/2007 | Redmond |
| 7,304,975 B2 | 12/2007 | Shvodian |
| 7,313,104 B1 | 12/2007 | Kern et al. |
| 7,330,877 B2 | 2/2008 | Kandala |
| 7,400,641 B2 | 7/2008 | Nitschke et al. |
| 7,400,642 B2 | 7/2008 | Koo et al. |
| 7,549,080 B1 | 6/2009 | Gardner et al. |
| 7,882,412 B2 | 2/2011 | Nanda |
| 2002/0093929 A1 | 7/2002 | Mangold et al. |
| 2002/0172186 A1 | 11/2002 | Larsson |
| 2003/0125040 A1 | 7/2003 | Walton et al. |
| 2003/0128684 A1 | 7/2003 | Hirsch et al. |
| 2004/0047319 A1 | 3/2004 | Elg |
| 2004/0125778 A1 | 7/2004 | Lin et al. |
| 2004/0151199 A1 | 8/2004 | Sykes et al. |
| 2004/0258091 A1 | 12/2004 | Meyer et al. |
| 2004/0264504 A1 | 12/2004 | Jin |
| 2005/0111462 A1 | 5/2005 | Walton et al. |
| 2005/0135291 A1 | 6/2005 | Ketchum et al. |
| 2005/0135295 A1 | 6/2005 | Walton et al. |
| 2005/0135318 A1 | 6/2005 | Walton et al. |
| 2005/0135403 A1 | 6/2005 | Ketchum et al. |
| 2005/0135416 A1 | 6/2005 | Ketchum et al. |
| 2005/0239407 A1 | 10/2005 | Foore et al. |
| 2006/0099956 A1 | 5/2006 | Harada et al. |
| 2006/0164969 A1 | 7/2006 | Malik et al. |
| 2006/0274844 A1 | 12/2006 | Walton et al. |
| 2007/0058605 A1 | 3/2007 | Meylan et al. |
| 2008/0130660 A1 | 6/2008 | Ros-Giralt et al. |
| 2009/0097444 A1 | 4/2009 | Lohr et al. |
| 2009/0103558 A1 | 4/2009 | Zangi et al. |
| 2009/0116434 A1 | 5/2009 | Lohr et al. |
| 2009/0128633 A1 * | 5/2009 | Chapman ...................... 348/180 |

FOREIGN PATENT DOCUMENTS

| | | |
|---|---|---|
| EP | 1052855 A2 | 11/2000 |
| EP | 1182900 A1 | 2/2002 |
| EP | 1261183 A1 | 11/2002 |
| EP | 1263159 A1 | 12/2002 |
| EP | 1317110 A1 | 6/2003 |
| EP | 1434380 A1 | 6/2004 |
| EP | 1326471 | 12/2008 |
| JP | 2226828 | 10/1990 |
| JP | 10164031 A | 6/1998 |
| JP | 2001160813 A | 6/2001 |
| JP | 2003060655 | 2/2003 |
| JP | 2003249939 A | 9/2003 |
| KR | 200258411 | 7/2002 |
| KR | 20030036847 | 5/2003 |
| KR | 200394974 | 12/2003 |
| KR | 20060090258 A | 8/2006 |
| KR | 20060090259 A | 8/2006 |
| RU | 2354437 | 5/2009 |
| WO | WO9905881 A1 | 2/1999 |
| WO | 9917489 A1 | 4/1999 |
| WO | WO0056113 A1 | 9/2000 |
| WO | WO0228119 A2 | 4/2002 |
| WO | WO0232039 A2 | 4/2002 |
| WO | WO0233852 A2 | 4/2002 |
| WO | WO02082751 A2 | 10/2002 |
| WO | WO02093843 A1 | 11/2002 |
| WO | WO03032526 A1 | 4/2003 |
| WO | WO03039074 A1 | 5/2003 |
| WO | WO2005039127 A1 | 4/2005 |
| WO | WO2005039133 A1 | 4/2005 |

OTHER PUBLICATIONS

3GPP2 C.S000-2-C. "Physical Layer Standard for cdma2000 Spread Spectrum Systems", version 1.0, Release C, May 28, 2002.

Ayanoglu E, et al., "Airmail: A Link-Layer Protocol for Wireless Networks", Wireless Networks, ACM, 2 Penn Plaza, Suite 701—New York USA, vol. 1, No. 1, Feb. 1, 1995, pp. 47-59, XP000503720, ISSN: 1022-0038, DOI: 10.1007IBF01196258.

Bao, G, "Performance Evaluation of TCP/RLP Protocol Stack Over CDMA Wireless Link", Wireless Networks, vol. 2, No. 3, 1996, pp. 229-237, XP000625341.

Brown G M et al: "Block Acknowledgement: Redesigning the Window Protocol" Computer Communication Review, ACM, New York, NY, US, vol. 19, No. 4, Sep. 1, 1989, pp. 128-135, XP000133117ISSN: 0146-4833.

ETSI TS 125 211 v5.6.0; "Universal Mobile Telecommunications System (UMTS); Physical channels and mapping of transport channels onto physical channels (FDD)", 3GPP TS 25.211 version 5.6.0 Release 5 (Sep. 2004).

ETSI TS 125 212 v6.2.0; "Universal Mobile Telecommunications System (UMTS); Multiplexing and channel coding (FDD)", 3G TS 25.212 version 6.2.0 Release 6 (Jun. 2004).

ETSI TS 125 214 v6.3.0; "Universal Mobile Telecommunications System (UMTS); Physical layer procedures (FDD)", 3G TS 25.214 version 6.3.0 Release 6 (Sep. 2004).

European Search Report—EP10155950, Search Authority—Munich Patent Office, Apr. 20, 2010.

(56) References Cited

OTHER PUBLICATIONS

International Search Report and Written Opinion—PCT/US05/035771, International Search Authority—European Patent Office—Apr. 3, 2006.

Masaharu Komatsu, "Resequencing Delay in the SelectiveRepeat ARQ Scheme", Transactions of the Institute of Electronics, Information and Communication Engineers of Japan, Inst. of Electronics & Communic. Engineers of Japan, Tokyo, JP, vol. E73, No. 6, (Jun. 1, 1990), pp. 867-869.

Seung et al., : "Multi-Stage Partial PIC Receivers for Multi-Rate DS-CDMA System with Multiple Modulation", IEEE 2003, pp. 591-594, Mar. 20, 2003.

Shu Lin, "The Development of ARQ System", Journal of China Institute of Communications, Feb. 4, 1982, pp. 65-74.

Won-Tae et al., : "MMAC : An Efficient WMATM MAC for Multicast Communications", Global Telecommunications Conference—Globecom '99, IEEE , pp. 587-591. Dec. 5-9, 1999.

Taiwan Search Report—TW094134832—TIPO—Apr. 3, 2012.

* cited by examiner

| FSN | 0 | 1 | 2 | 3 | 4 | 5 | 6 | 7 | 8 | 9 | ••• | N-1 | TIME |
|---|---|---|---|---|---|---|---|---|---|---|---|---|---|
| | TX | TX | TX | TX | | | | | | | ••• | | 0 |
| | | | | | TX | TX | TX | TX | | | ••• | | 1 |
| | TX | | TX | | | | | | TX | TX | ••• | | 2 |

FIG. 7
700

| FSN | 0 | 1 | 2 | 3 | 4 | 5 | 6 | 7 | 8 | 9 | ••• | N-1 |
|---|---|---|---|---|---|---|---|---|---|---|---|---|
| BA | 0 | 1 | 0 | 1 | 0 | 0 | 0 | 0 | 0 | 0 | ••• | 0 |

FIG. 8
800

| FSN | 0 | 1 | 2 | 3 | 4 | 5 | 6 | 7 | 8 | 9 | ••• | N-1 |
|---|---|---|---|---|---|---|---|---|---|---|---|---|
| BA | 0 | 1 | 0 | 1 | 1 | 1 | 0 | 0 | 0 | 0 | ••• | 0 |

FIG. 9
900

| FSN | 0 | 1 | 2 | 3 | 4 | 5 | 6 | 7 | 8 | 9 | ••• | N-1 | |
|---|---|---|---|---|---|---|---|---|---|---|---|---|---|
| NAK? | ? | | ? | | | | NAK | NAK | ? | ? | ••• | 0 | TIME < D |
| NAK? | NAK | | NAK | | | | NAK | NAK | NAK | NAK | ••• | 0 | TIME > D |

FIG. 10
1000

ENHANCED BLOCK ACKNOWLEDGEMENT

The present Application for Patent is a Divisional and claims priority to Patent application Ser. No. 11/237,413 entitled "Enhanced Block Acknowledgement" filed Sep. 27, 2005, and to Provisional Application No. 60/616,335 entitled "Method And Apparatus For Control Messaging In Wireless Networks" filed Oct. 5, 2004, and assigned to the assignee hereof and hereby expressly incorporated by reference herein.

BACKGROUND

1. Field

The present invention relates generally to wireless communications, and amongst other things to enhanced block acknowledgement.

2. Background

Wireless communication systems are widely deployed to provide various types of communication such as voice and data. A typical wireless data system, or network, provides multiple users access to one or more shared resources. A system may use a variety of multiple access techniques such as Frequency Division Multiplexing (FDM), Time Division Multiplexing (TDM), Code Division Multiplexing (CDM), and others.

Example wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard).

Other examples of wireless systems include Wireless Local Area Networks (WLANs) such as the IEEE 802.11 standards (i.e. 802.11(a), (b), or (g)). Improvements over these networks may be achieved in deploying a Multiple Input Multiple Output (MIMO) WLAN comprising Orthogonal Frequency Division Multiplexing (OFDM) modulation techniques. IEEE 802.11(e) has been introduced to improve upon some of the shortcomings of previous 802.11 standards.

As wireless system designs have advanced, higher data rates have become available. Higher data rates have opened up the possibility of advanced applications, among which are voice, video, fast data transfer, and various other applications. However, various applications may have differing requirements for their respective data transfer. Many types of data may have latency and throughput requirements, or need some Quality of Service (QoS) guarantee. Without resource management, the capacity of a system may be reduced, and the system may not operate efficiently.

Medium Access Control (MAC) protocols are commonly used to allocate a shared communication resource between a number of users. MAC protocols commonly interface higher layers to the physical layer used to transmit and receive data. To benefit from an increase in data rates, a MAC protocol must be designed to utilize the shared resource efficiently.

One feature allowing some efficiency gains in prior art systems is the block acknowledgement, or Block Ack, mechanism. This allows a receiving station to send one acknowledgement for a plurality of received frames (or frame segments). There is therefore a need in the art for enhanced block acknowledgment.

SUMMARY

Embodiments disclosed herein address the need in the art for enhanced block acknowledgement.

According to one aspect, an apparatus is described which includes a transmitter transmitting a plurality of frames and a plurality of block acknowledgements to a remote station, a receiver receiving a block acknowledgment from the remote station, and a processor configured to determine to which block acknowledgement request the block acknowledgment is responsive based on a delay parameter.

According to another aspect, a method is disclosed for transmitting a plurality of frames to a remote station, transmitting a plurality of block acknowledgment requests to the remote station, receiving a block acknowledgment from the remote station, and determining to which of the plurality of block acknowledgement requests the block acknowledgment is responsive based on a delay parameter.

According to another aspect, an apparatus is described which includes a transmitter transmitting a plurality of frames and a plurality of block acknowledgement requests to a remote station, a receiver receiving a block acknowledgment from the remote station, and means for determining to which of the plurality of block acknowledgement requests the block acknowledgment is responsive based on a delay parameter.

According to another aspect, a method is disclosed for receiving frames for transmission to a remote device, associating a frame sequence identifier with each frame; and generating a plurality of transmit sequence indicators, each transmit sequence indicator associated with one of a plurality of blocks, each block comprising one or more of the frames for transmission to the remote device.

According to another aspect, an apparatus is described which includes means for storing a plurality of frames for transmission to a remote station, means for storing a frame sequence identifier for each of the plurality of frames for transmission to a remote station, and means for storing a transmit sequence indicator for each of the plurality of frames for transmission to a remote station.

According to another aspect, a message is described which includes a header field, a block acknowledgment request control field, a block acknowledgement starting sequence control field, a transmit sequence indicator field, and a frame check sequence.

According to another aspect, a message is described which includes a transmit sequence indicator field, and a field indicating the message includes a block acknowledgement request.

According to another aspect, a message is described which includes a header field, a block acknowledgment control field, a block acknowledgement starting sequence control field, a block acknowledgement bitmap, a received transmit sequence indicator field, and a frame check sequence.

According to another aspect, a message is described which includes a received transmit sequence indicator field, and a block acknowledgement field.

According to another aspect, an apparatus is described which includes a memory comprising an input and an output, the input configured to receive a plurality of frames for transmission to a remote device, and a processor, coupled with the memory, configured to associate a frame sequence identifier with each frame and to generate a plurality of transmit sequence indicators, each transmit sequence indicator associated with one of a plurality of blocks, each block comprising one or more of the frames for transmission to the remote device.

According to another aspect, an apparatus is described which includes means for receiving frames for transmission to a remote device, means for associating a frame sequence identifier with each frame, and means for generating a plurality of transmit sequence indicators, each transmit sequence indicator associated with one of a plurality of blocks, each block comprising one or more of the frames for transmission to the remote device.

According to another aspect, an apparatus is described which includes a receiver having a receiver input and a receiver output, receiving a first plurality of frames and a first transmit sequence indicator associated with the first plurality of frames on the receiver input, a decoder having a decoder input coupled to the receiver output and a decoder output, a message generator having a message generator input coupled to the decoder output and a message generator output, a message comprising the received first transmit sequence indicator and a block acknowledgment of the first plurality of frames in accordance with the decoder output delivered on the message generator output, and a transmitter having a transmitter input coupled to the message generator output and a transmitter output, the message of the message generator output transmitted on the transmitter output.

According to another aspect, a method is disclosed for receiving from a remote station a plurality of frames and a transmit sequence indicator associated with the received plurality of frames, decoding the plurality of frames, determining a positive or negative acknowledgement for each of the plurality of frames, generating a message comprising the determined positive or negative acknowledgment for each of the plurality of frames and the transmit sequence indicator associated with the received plurality of frames, and transmitting the message to the remote station.

According to another aspect, an apparatus is described which includes a receiver receiving one or more pluralities of frames and one or more associated transmit sequence indicators, a transmitter transmitting a block acknowledging message, and means for generating the block acknowledging message comprising the positive or negative acknowledgement for at least one of the one or more pluralities of frames and the transmit sequence indicator associated with the latest received plurality of frames for which positive or negative acknowledgment is provided in the block acknowledgement message.

According to another aspect, computer readable media is disclosed, operable to perform transmitting a plurality of frames to a remote station, transmitting a plurality of block acknowledgment requests to the remote station, receiving a block acknowledgment from the remote station, and determining to which of the plurality of block acknowledgement requests the block acknowledgment is responsive based on a delay parameter.

According to another aspect, computer readable media is disclosed, operable to perform receiving frames for transmission to a remote device, associating a frame sequence identifier with each frame, and generating a plurality of transmit sequence indicators, each transmit sequence indicator associated with one of a plurality of blocks, each block comprising one or more of the frames for transmission to the remote device.

According to another aspect, computer readable media is disclosed, operable to perform receiving from a remote station a plurality of frames and a transmit sequence indicator associated with the received plurality of frames, decoding the plurality of frames, determining a positive or negative acknowledgement for each of the plurality of frames, generating a message comprising the determined positive or negative acknowledgment for each for each of the plurality of frames and the transmit sequence indicator associated with the received plurality of frames, and transmitting the message to the remote station.

Various other aspects and embodiments are also disclosed.

BRIEF DESCRIPTION OF THE DRAWINGS

FIGS. 7-10 depict illustrations of aspects of transmitted frames, Block Acks, and corresponding NAKs;

DETAILED DESCRIPTION

Example embodiments are disclosed herein that support, among other example embodiments, highly efficient operation in conjunction with very high bit rate physical layers for a wireless LAN (or similar applications that use newly emerging transmission technologies). The example WLAN supports bit rates in excess of 100 Mbps (million bits per second) in bandwidths of 20 MHz. Various alternate WLANs are also supported.

Various example embodiments preserve the simplicity and robustness of the distributed coordination operation of legacy WLAN systems, examples of which are found in 802.11(a-e). The advantages of the various embodiments may be achieved while maintaining backward compatibility with such legacy systems. (Note that, in the description below, 802.11 systems may be described as example legacy systems. Those of skill in the art will recognize that the improvements are also compatible with alternate systems and standards.)

An example WLAN may comprise a sub-network protocol stack. The sub-network protocol stack may support high data rate, high bandwidth physical layer transport mechanisms in general, including, but not limited to, those based on OFDM modulation, single carrier modulation techniques, systems using multiple transmit and multiple receive antennas (Multiple Input Multiple Output (MIMO) systems, including Multiple Input Single Output (MISO) systems) for very high bandwidth efficiency operation, systems using multiple transmit and receive antennas in conjunction with spatial multiplexing techniques to transmit data to or from multiple user terminals during the same time interval, and systems using code division multiple access (CDMA) techniques to allow transmissions for multiple users simultaneously. Alternate examples include Single Input Multiple Output (SIMO) and Single Input Single Output (SISO) systems.

One or more exemplary embodiments described herein are set forth in the context of a wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps. Method steps can be interchanged without departing from the scope of the present invention. The word "exemplary" is used herein to mean "serving as an example, instance, or illustration." Any embodiment described herein as "exemplary" is not necessarily to be construed as preferred or advantageous over other embodiments.

Figure 1:
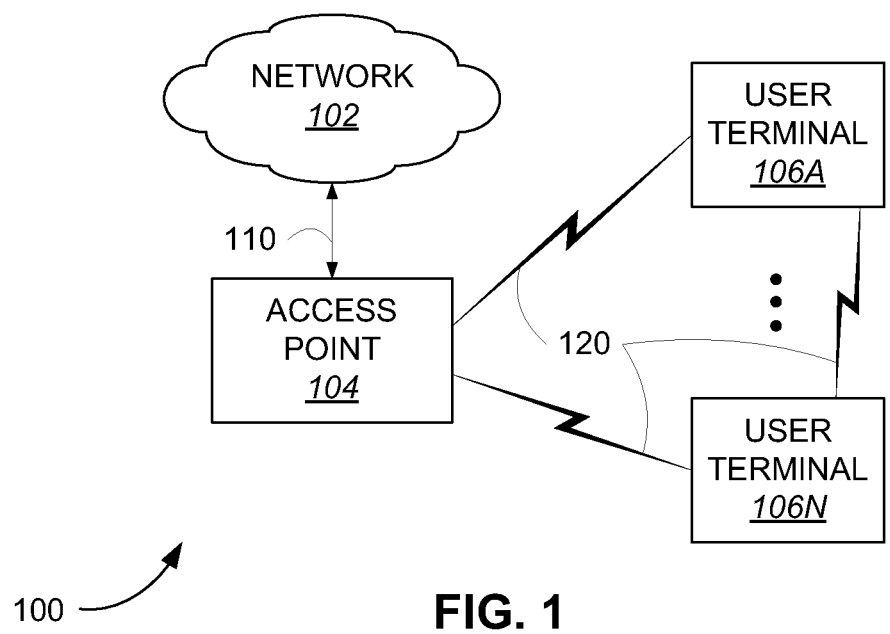
FIG. 1 is a general block diagram of a wireless communication system capable of supporting a number of users.

FIG. 1 is an example embodiment of system 100, comprising an Access Point (AP) 104 connected to one or more User Terminals (UTs) 106A-N. In accordance with 802.11 terminology, in this document the AP and the UTs are also referred to as stations or STAs. The techniques and embodiments described herein are also applicable to other types of systems (examples include the cellular standards detailed above). As used herein, the term base station can be used interchangeably with the term access point. The term user terminal can be used interchangeably with the terms user equipment (UE), subscriber unit, subscriber station, access terminal, remote terminal, mobile station, or other corresponding terms known in the art. The term mobile station encompasses fixed wireless applications.

Note also that user terminals 106 may communicate directly with one another. The Direct Link Protocol (DLP), introduced by 802.11(e), allows a STA to forward frames directly to another destination STA within a Basic Service Set (BSS) (controlled by the same AP). In various embodiments, as known in the art, an access point is not required. For example, an Independent BSS (IBSS) may be formed with any combination of STAs. Ad hoc networks of user terminals may be formed which communicate with each other via wireless network 120 using any of the myriad communication formats known in the art.

The AP and the UTs communicate via Wireless Local Area Network (WLAN) 120. In the example embodiment, WLAN 120 is a high speed MIMO OFDM system. However, WLAN 120 may be any wireless LAN. Optionally, access point 104 communicates with any number of external devices or processes via network 102. Network 102 may be the Internet, an intranet, or any other wired, wireless, or optical network. Connection 110 carries the physical layer signals from the network to the access point 104. Devices or processes may be connected to network 102 or as UTs (or via connections therewith) on WLAN 120. Examples of devices that may be connected to either network 102 or WLAN 120 include phones, Personal Digital Assistants (PDAs), computers of various types (laptops, personal computers, workstations, terminals of any type), video devices such as cameras, camcorders, webcams, and virtually any other type of data device. Processes may include voice, video, data communications, etc. Various data streams may have varying transmission requirements, which may be accommodated by using varying Quality of Service (QoS) techniques.

System 100 may be deployed with a centralized AP 104. All UTs 106 communicate with the AP in one example embodiment. In an alternate embodiment, direct peer-to-peer communication between two UTs may be accommodated, with modifications to the system, as will be apparent to those of skill in the art, examples of which are illustrated below. Any station may be set up as a designated AP in embodiments supporting designated access points. Access may be managed by an AP, or ad hoc (i.e. contention based).

In one embodiment, AP 104 provides Ethernet adaptation. In this case, an IP router may be deployed in addition to the AP to provide connection to network 102 (details not shown). Ethernet frames may be transferred between the router and the UTs 106 over the WLAN sub-network (detailed below). Ethernet adaptation and connectivity are well known in the art.

In an alternate embodiment, the AP 104 provides IP Adaptation. In this case, the AP acts as a gateway router for the set of connected UTs (details not shown). In this case, IP datagrams may be routed by the AP 104 to and from the UTs 106. IP adaptation and connectivity are well known in the art.

The Block Ack mechanism is defined in 802.11e as an enhancement of the 802.11 ACK scheme. Instead of requiring the receiver to provide immediate acknowledgment after every frame transmission, the Block Ack mechanism permits the transmitting STA to transmit a number of frame (or fragments) up to the size of the Block Ack window before transmitting a Block Ack Request (BAR).

Depending on the Block Ack method that is negotiated at the establishment of a flow, a receiver responds to the Block Ack request in one of the following ways:

1. Immediate Block Ack: Following a SIFS (short inter-frame spacing) after the reception of the BAR, the receiver responds to the BAR with a Block Ack (BA) indicating the ACK/NAK status of the block of frames transmitted.
2. Delayed Block Ack: The Block Ack (BA) may be transmitted by the receiver at a subsequent transmission opportunity. However, an immediate ACK may be transmitted by the receiver to indicate successful reception of the BAR frame.

Figure 2:
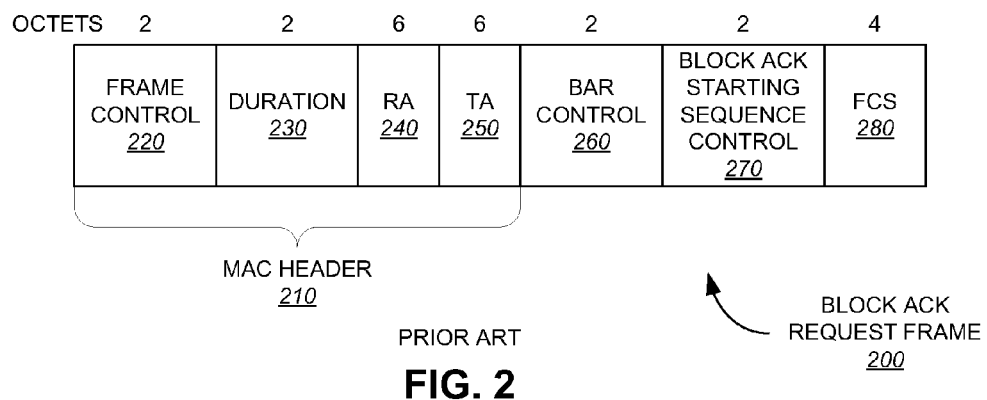
FIG. 2 depicts a prior art Block Ack Request frame.

FIG. 2 depicts a prior art Block Ack Request (BAR) frame 200. Block Ack Request frame 200 comprises MAC header 210. MAC header 210 comprises frame control 220, a duration field 230, a Receive Address (RA) 240, and a Transmit Address (TA) 250. Block Ack Request control field 260 is used to specify various parameters relating to the type of block acknowledgement request. BAR frame 200 further comprises a block ack starting sequence control 270, described further below, and a Frame Check Sequence (FCS) 280.

Figure 3:
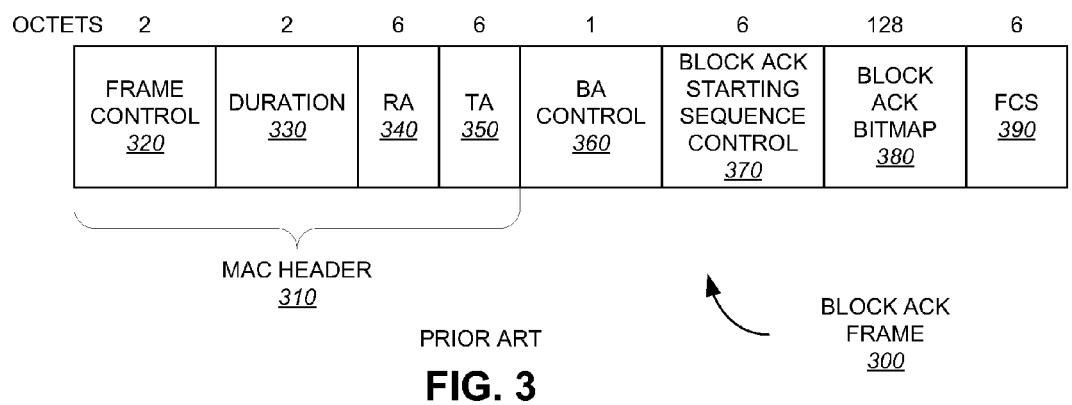
FIG. 3 depicts a prior art Block Ack frame.

FIG. 3 depicts a Block Ack (BA) frame 300, as known in the art. Block Ack frame 300 comprises a MAC header 310, similar to MAC header 210, described above, including a frame control 320, duration 330, RA 340, and TA 350. Block Ack frame 300 also comprises Block Ack control 360 for indicating the type of block acknowledgement being transmitted. BA frame 300 further comprises BA starting sequence control 370 and BA bitmap 380, detailed further below, followed by an FCS 390. The Block Ack Starting Sequence Control field contains the sequence number of the first MSDU for which this BAR is sent. In the responsive Block Ack frame, the receiver responds with the same starting sequence number and indicates the ACK/NAK status of up to 64 subsequent MSDUs in the Block Ack Bitmap. The format of the Block Ack Bitmap assigns 16 bits per frame for up to 64 frames in the window starting at the starting sequence number. Each bit in the bitmap indicates the ACK/NAK status of one of (up to 16 fragments) for each frame. Note that in various embodiments detailed herein, a NAK may be identified by a 0 in a bitmap, and an ACK as 1. This is for example only, as skilled practitioners will readily adapt alternate bitmaps or NAK/ACK representations as desired. Any type of bit field may be deployed. For example, ACKs and NAKs may be included for aggregate frames, frames, portions of frames, etc. As used herein, the term frame may be applied broadly to any data portion.

Several methods for compressing the BA bitmap are disclosed in related co-pending U.S. patent application Ser. No. 10/964,330, entitled "HIGH SPEED MEDIA ACCESS CONTROL WITH LEGACY SYSTEM INTEROPERABILITY", filed Oct. 13, 2004, assigned to the assignee of the present invention and incorporated by reference herein (hereinafter the '330 application).

To take advantage of the increased PHY data rates in 802.11n, a number of MAC efficiency enhancements may be deployed. These may include frame aggregation and reduced inter-frame spacing, examples of which are disclosed in related co-pending U.S. patent application Ser. No. 11/158,589, entitled "WIRELESS LAN PROTOCOL STACK", filed Jun. 21, 2005, assigned to the assignee of the present invention and incorporated by reference herein. Also introduced in 802.11n are advanced channel coding schemes, e.g. serial or parallel concatenated turbo codes and/or LDPC codes. The introduction of advanced coding schemes (requiring iterative decoding), large aggregate frames, and the removal of inter-frame spacing may impose significant decoder complexity at the receiver. Immediate Block Ack in response to aggregate frame transmissions or transmissions using advanced coding schemes may impose a significant complexity burden. It is desirable to allow operation with delayed decoding, for relatively low capability, low complexity receivers.

The 802.11e Block Ack mechanism may be enhanced for operation as a window-based ARQ. This means that it is not necessary to stop and wait for a BA after transmitting a BAR. BAR may be sent after transmitting a fraction of the window, followed by the transmission of more frames before the corresponding BA response is received. BAs may be delivered asynchronously to the transmitter to keep the ARQ window moving forward without "protocol stalling." Many such ARQ protocols have been previously defined e.g. in GPRS, CDMA, SSCOP (ATM Service Specific Connection Oriented Protocol).

For correct operation with delayed decoding, the ARQ engine at the transmitter knows which frames have been lost and which frames are "in-transit." In this case, "in transit" may mean that frames are being decoded at the receiver.

Various embodiments for solving these problems are detailed below. Examples include the following: One, a receiver indicates a decoding delay for a maximum size aggregate frame in Block Ack negotiation. Two, a BAR Transmission Sequence Number (BAR_TSN, or simply TSN) may be included in the BAR. The receiver includes the BAR_TSN in the corresponding BA response. This permits correct operation of the window-based ARQ by allowing the transmitter to determine which frames are "in transit." In various embodiments detailed below, a TSN is used to identify blocks. In general, any type of transmit sequence indicator, including, numbers, characters, etc., may be deployed. Three, a TSN may be associated with one or more transmitted frames. The TSN is not transmitted with the BAR. The transmitter will determine which TSN corresponds with a BA response, as detailed further below. Combinations of one or more of these examples, or other embodiments, may be deployed as well.

Figure 4:
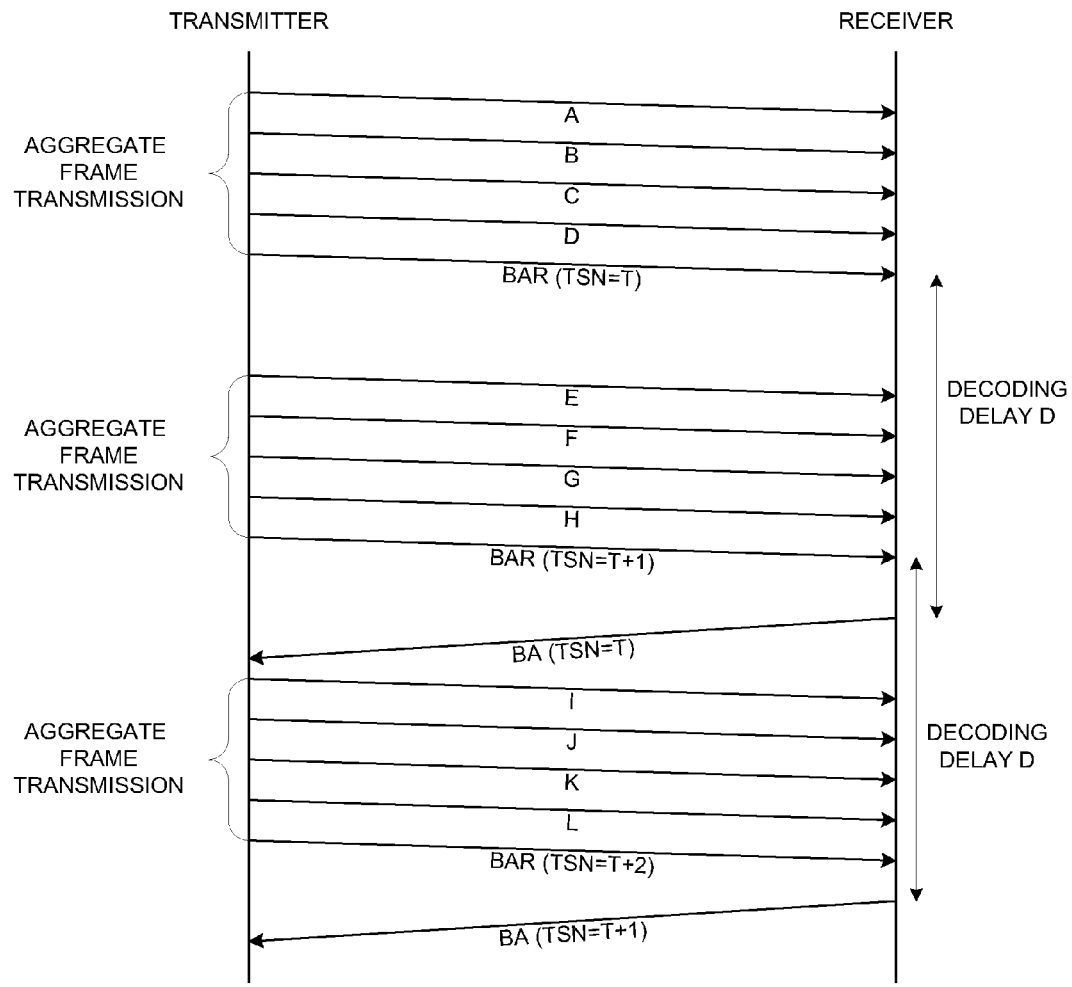
FIG. 4 shows aspects of transmission of frames from a transmitting STA to a receiving STA.

FIG. 4 shows an example transmission of frames from a transmitting STA to a receiving STA. In this figure, time is increasing from top to bottom. The frames may be transmitted as an aggregate frame as shown. In this example, frames A, B, C, and D are transmitted as an aggregate frame and a Block Ack Request BAR (TSN=T) is included in the aggregate. The TSN indicates a Transmission Sequence Number of the BAR, as discussed below. As an alternative, the BAR may be implicit in the aggregate, i.e., every aggregate frame transmission implicitly includes a Block Ack Request by including the following fields: BAR Control, BA Starting Sequence Control and the BAR TSN.

The transmitter obtains another transmit opportunity (scheduled or through contention) and transmits frames E, F, G, and H along with BAR (TSN=T+1) as an aggregate frame transmission. Note that the letters A, B, C, D, E, F, G, and H represent frame sequence numbers (any frame sequence identifier or indicator may be used). This is done deliberately to show that the transmitted frames need not correspond to consecutive sequence numbers. This would be the case, for example, when some of the frames transmitted in the aggregate are retransmission of previously NAKed frames while others are initial transmissions of frames (which would be in-sequence).

In this example, assume that the low complexity receiver incurs a decoding delay for decoding the transmitted aggregate. This is shown as Decoding Delay D in the Figure. Hence, the decoding of the first aggregate in this case is completed after the transmitter has completed the transmission of the second aggregate and the second BAR with TSN=T+1.

When the transmitter receives the Block Ack with TSN=T, it will indicate that frames E, F, G, H have not been received. Unless the transmitter is aware of the possibility of delayed decoding, it would not be aware that these frames are undergoing decoding at the receiver and are therefore "in transit." In this circumstance, the transmitter is made aware of the fact and does not mark these frames for retransmission.

Figure 5:
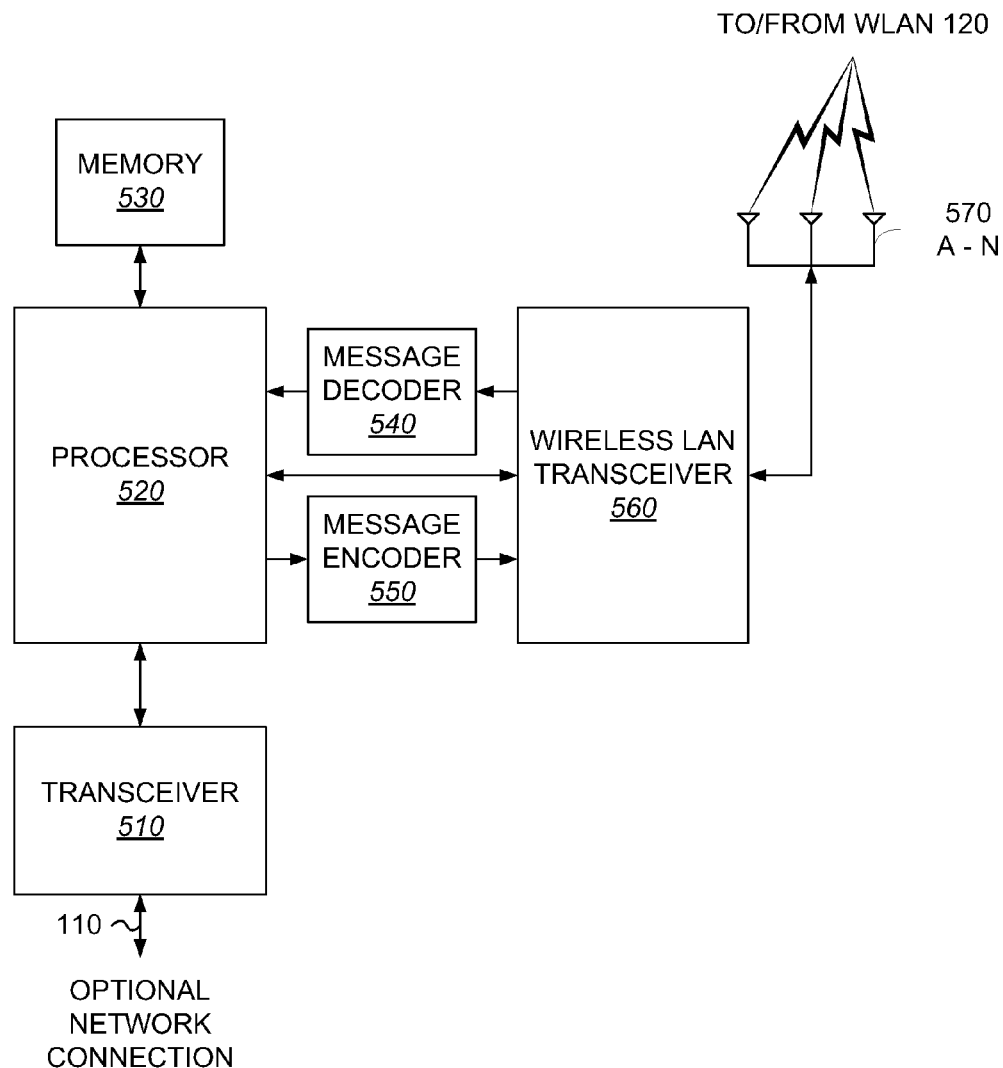
FIG. 5 depicts examplary embodiments of a wireless communication device.

FIG. 5 depicts an example embodiment of a wireless communication device, which may be configured as an access point 104 or user terminal 106. A wireless communication device is an example STA, suitable for deployment in system 100. An access point 104 configuration is shown in FIG. 5. Transceiver 510 receives and transmits on connection 110 according to the physical layer requirements of network 102. Data from or to devices or applications connected to network 102 are delivered to processor 520. These data may be referred to herein as flows. Flows may have different characteristics and may require different processing based on the type of application associated with the flow. For example, video or voice may be characterized as low-latency flows (video generally having higher throughput requirements than voice). Many data applications are less sensitive to latency, but may have higher data integrity requirements (i.e., voice may be tolerant of some packet loss, file transfer is generally intolerant of packet loss).

Processor 520 may include a Media Access Control (MAC) processing unit (details not shown) that receives flows 260 and processes them for transmission on the physical layer. Processor 520 may also receive physical layer data and process the data to form packets for outgoing flows. 802.11 WLAN related control and signaling may also be communicated between the AP and the UTs. MAC Protocol Data Units (MPDUs) encapsulated in Physical layer (PHY) Protocol Data Units (PPDUs) are delivered to and received from wireless LAN transceiver 560. An MPDU is also referred to as a frame. When a single MPDU is encapsulated in a single PPDU, sometimes the PPDU may be referred to as a frame. Alternate embodiments may employ any conversion technique, and terminology may vary in alternate embodiments. Feedback corresponding to the various MAC IDs may be returned from the physical layer processor 520 for various purposes. Feedback may comprise any physical layer information, including supportable rates for channels (including multicast as well as unicast channels), modulation format, and various other parameters.

Processor 520 may be a general-purpose microprocessor, a digital signal processor (DSP), or a special-purpose processor. Processor 520 may be connected with special-purpose hardware to assist in various tasks (details not shown). Various applications may be run on externally connected processors, such as an externally connected computer or over a network connection, may run on an additional processor within wireless communication device 104 or 106 (not shown), or may run on processor 520 itself. Processor 520 is shown connected with memory 530, which may be used for storing data as well as instructions for performing the various procedures and methods described herein. Those of skill in the art will recognize that memory 530 may be comprised of one or more memory components of various types, that may be embedded in whole or in part within processor 520. In addition to storing instructions and data for performing functions described herein, memory 530 may also be used for storing data associated with various queues.

Wireless LAN transceiver 560 may be any type of transceiver. In an example embodiment, wireless LAN transceiver 560 is an OFDM transceiver, which may be operated with a MIMO or MISO interface. OFDM, MIMO, and MISO are known to those of skill in the art. Various example OFDM, MIMO and MISO transceivers are detailed in co-pending U.S. patent application Ser. No. 10/650,295, entitled "FREQUENCY-INDEPENDENT SPATIAL-PROCESSING FOR WIDEBAND MISO AND MIMO SYSTEMS", filed Aug. 27, 2003, and assigned to the assignee of the present invention. Alternate embodiments may include SIMO or SISO systems.

Wireless LAN transceiver 560 is shown connected with antennas 570 A-N. Any number of antennas may be supported in various embodiments. Antennas 570 may be used to transmit and receive on WLAN 120.

Wireless LAN transceiver 560 may comprise a spatial processor in communication with each of the one or more antennas 570. The spatial processor may process the data for transmission independently for each antenna or jointly process the received signals on all antennas. Examples of the independent processing may be based on channel estimates, feedback from the UT, channel inversion, or a variety of other techniques known in the art. The processing is performed using any of a variety of spatial processing techniques. Various transceivers of this type may transmit utilizing beam forming, beam steering, eigen-steering, or other spatial techniques to increase throughput to and from a given user terminal. In an example embodiment, in which OFDM symbols are transmitted, the spatial processor may comprise sub-spatial processors for processing each of the OFDM subchannels, or bins.

In an example system, the AP (or any STA, such as a UT) may have N antennas, and an example UT may have M antennas. There are thus M×N paths between the antennas of the AP and the UT. A variety of spatial techniques for improving throughput using these multiple paths are known in the art. In a Space Time Transmit Diversity (STTD) system (also referred to herein as "diversity"), transmission data is formatted and encoded and sent across all the antennas as a single stream of data. With M transmit antennas and N receive antennas there may be MIN (M, N) independent channels that may be formed. Spatial multiplexing exploits these independent paths and may transmit different data on each of the independent paths, to increase the transmission rate.

Various techniques are known for learning or adapting to the characteristics of the channel between the AP and a UT. Unique pilots may be transmitted from each transmit antenna. In this case, the pilots are received at each receive antenna and measured. Channel state information feedback may then be returned to the transmitting device for use in transmission. Eigen decomposition of the measured channel matrix may be performed to determine the channel eigenmodes. An alternate technique, to avoid eigen decomposition of the channel matrix at the receiver, is to use eigen-steering of the pilot and data to simplify spatial processing at the receiver.

Thus, depending on the current channel conditions, varying data rates may be available for transmission to various user terminals throughout the system. In particular, the specific link between the AP and each UT may be higher performance than a multicast or broadcast link that may be shared from the AP to more than one UT. The wireless LAN transceiver 570 may determine the supportable rate based on whichever spatial processing is being used for the physical link between the AP and the UT. This information may be fed back for use in MAC processing.

For illustration purposes, message decoder 540 is deployed between wireless LAN transceiver 560 and processor 520. In an example embodiment, the function of message decoder 540 may be performed within processor 520, wireless LAN transceiver 560, other circuitry, or a combination thereof. Message decoder 540 is suitable for decoding any number of control data or signaling messages for performing communications within the system. In one example, message decoder 540 is suitable for receiving and decoding a Block Ack message, such as BA frame 300 or BA frame 2100, described below, or Block Ack Request frame 200 or 2000, as described below. Various other messages may be decoded using any number of message decoding techniques well known in the art. Message encoder 550 may be similarly deployed between processor 520 and wireless LAN transceiver 560 (and may also be performed in whole or in part in processor 520, wireless LAN transceiver 560, other circuitry, or a combination thereof), and may perform encoding of messages such as those just described. Techniques for message encoding and decoding are well known to those of ordinary skill in the art.

Referring back to FIG. 4, if the transmitter is aware of the decoder delay D at the receiver, then it knows that the aggregate frame containing frames E, F, G, and H was transmitted more recently than D and therefore concludes that these frames are in transit. To accomplish this, the transmitter should be aware of the decoding delay associated with the largest size aggregate that can be transmitted to the receiver. Both the largest aggregate size and the decoding delay associated with the largest aggregate size can be negotiated as part of the Block Ack negotiation for the flow.

Figure 6:
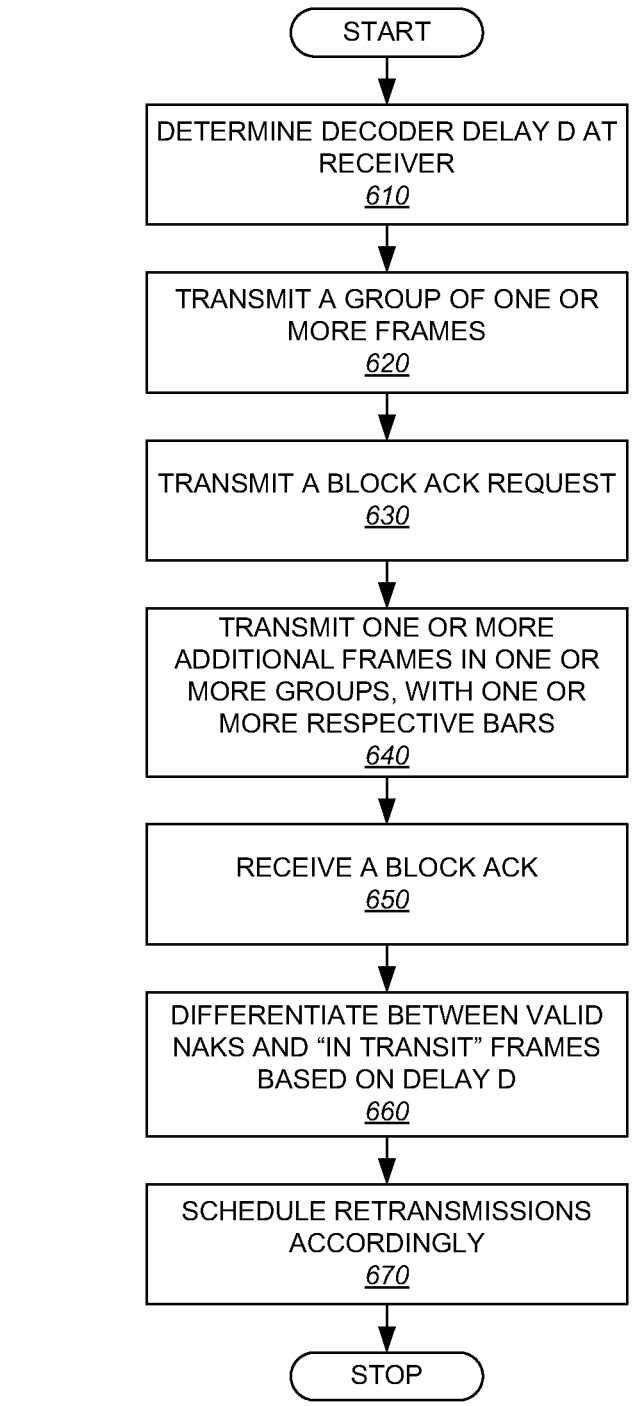
FIG. 6 depicts examplary embodiments of method for determining valid NAKs based on expected decoder delay.

An example embodiment of method 600 for determining valid NAKs based on expected decoder delay is depicted in FIG. 6. The process begins at 610, where a transmitting device (any type of STA, including an AP or a UT) determines the decoder delay D at an intended receiver (again, any type of station). Decoder delay D may be negotiated between the stations, may be signaled any time during a communication session, or may be estimated using measurement techniques. A station may communicate with a plurality of other stations, each of which may have varying decoder delays D. Decoder delay D, as described above, may be variable due to the type of modulation format selected, the processing capabilities of the receiver, or various other factors. At 620, the station transmits a group of one or more frames to the receiver. The frames may comprise multiple sub-frames or fragments. These frames may be transmitted as one or more aggregate frames, or a series of frames, or any other combination of multiple frames for which a Block Ack (BA) will be desired. At 630, subsequent to the transmission of the group of one or more frames, the transmitting station transmits a BAR. At 640, the transmitting station transmits one or more additional frames in one or more groups, as described above, with one or more respective BARs. This is shown to illustrate that the transmitter may continue transmitting subsequent to the BAR at 630 to allow time for the receiver to decode the received frames. At 650, which may occur in parallel with continued transmission as described in 640, the transmitting station receives a BA from the receiving station. At 660, the transmitting station differentiates between valid NAKs and "in-transit" frames based on the delay D, wherein the NAKs are indicated using any type of NAK messaging, an example of which is the BA bitmap 380 described above. At 670, the transmitter schedules re-transmissions accordingly. Then the process may stop. Note that this process may be iterated indefinitely.

The process just described may be illustrated through an example. FIG. 7 depicts an illustration of transmitted frames. Depicted in FIG. 7 is a series of transmissions 700. The top row, identified as the Frame Sequence Number (FSN), indicates the frame sequence number within the transmit buffer. In this example, there are N possible frames in the transmit buffer, although the buffer may contain fewer frames for transmission. Below the top column are sequences indicating which frames from the transmit buffer were transmitted in time. Thus, at time zero, frames 0-3 are transmitted. At time one, frames 4-7 are transmitted. In this example, it is assumed that a BAR is transmitted following the transmission of frames 0-3 and a second BAR is transmitted following the transmission of frames 4-7. Also, in this example, assume that a prior BA has been received indicating a valid NAK of frames 0 and 2. BA 800, depicted in FIG. 8, illustrates this situation. Note that, as shown in FIG. 8, frames 1 and 3 are acknowledged as validly received. Thus, since frames 0 and 2 were transmitted in the same block as 1 and 3, the NAKs associated with those frames must be valid because the decoding must be complete in order to acknowledge frames 1 and 3. Hence, as shown in FIG. 7, at time two, frames 0 and 2 are retransmitted. In this case new frames 8 and 9 are transmitted as well.

Continuing this example, assume now that BA 900, such as shown in FIG. 9, is received. Using the delay method detailed above with respect to FIG. 6, the time that has transpired between a transmission at time two and the receipt of BA 900 will determine whether or not the non-acknowledged frames are valid NAKs. For example, the acknowledged frames are self evident, but the receipt of frames 6, 7, 8, and 9, and the re-transmission of frames 0 and 2, may be "in-transit", not actually NAKed. Note that, in this case, if the BA is transmitted subsequent to frame 7, then the acknowledgement of frames 4 and 5 would indicate that the NAKs are valid for frames 6 and 7, within the same group. Nonetheless, it is unclear whether frames 0, 2, 8, and 9 are in transit or not. In general, with the delay method described, it can be assumed that frames sent too recently with respect to delay D are still in transit. Frames that have had time D or greater to process will be valid NAKs. Thus, if a delay greater than D has transpired between the transmission of the frames at time two, shown in FIG. 7, and the receipt of BA 900, depicted in FIG. 9, then it can be assumed that the NAKs of frames 0, 2, 8, and 9 are valid.

In designing such systems it should be noted that assuming too small of a delay may cause unnecessary re-transmission of these frames which may be "in transit", while assuming too large of a delay may increase latency by deterring the re-transmission of incorrectly decoded frames for too long a period of time. The two choices described above are illustrated in FIG. 10. Note that when the time between transmission of frames at time two and the receipt of BA 900 is less than D, the NAKs of frames 6 and 7 are considered valid, as they correspond with valid NAKs 4 and 5, but the zeroes corresponding to frames sequence numbers 0, 2, 8, and 9 are unknown, thus a NAK will not be determined and re-transmission will not be scheduled. The question marks in this row indicate that the frames may yet be in transit. The bottom row indicates that the time transpired is greater than D and thus the NAKs to frames 6 and 7 are valid, as before, as well as the NAKs for frames 0, 2, 8, and 9.

As described above, decoding delays at the receiver can be variable for a number of reasons. For example: (a) The decoding delay is a function of the size of the transmitted aggregate; (b) Advanced coding uses recursive decoding techniques that may be implemented with a variable number of recursions with variable delay; and/or (c) The processor load at the receiving STA can vary depending how many other STAs are communicating with the receiving STA.

As described above, when assuming a fixed decoding delay, if the actual delay is variable, the result may be inefficient ARQ operation. If the actual delay is smaller, the transmitter may not mark as NAK frames that are lost. Recovery for these frames will then be delayed until another BA is received with the same indication. If the actual delay is larger, then frames will be retransmitted unnecessarily. Either case results in inefficient ARQ operation.

In one embodiment, by sending a transmit sequence number (TSN) in the BAR, and by including the TSN in the corresponding BA, these problems may be resolved. In this case, when the BA is received, the transmitter immediately knows which frames were transmitted prior to the corresponding BAR and which frames were transmitted after the corresponding BAR. In the example shown in FIG. 4, when the BA with TSN=T is received, the transmitter knows that it includes the ACK status of frames A, B, C, and D, and that the frames E, F, G, and H are in transit (i.e., at the receiver decoder). Note that this does not require the transmitter to be told the value of the decoding delay D during Block Ack negotiation.

Figure 11:
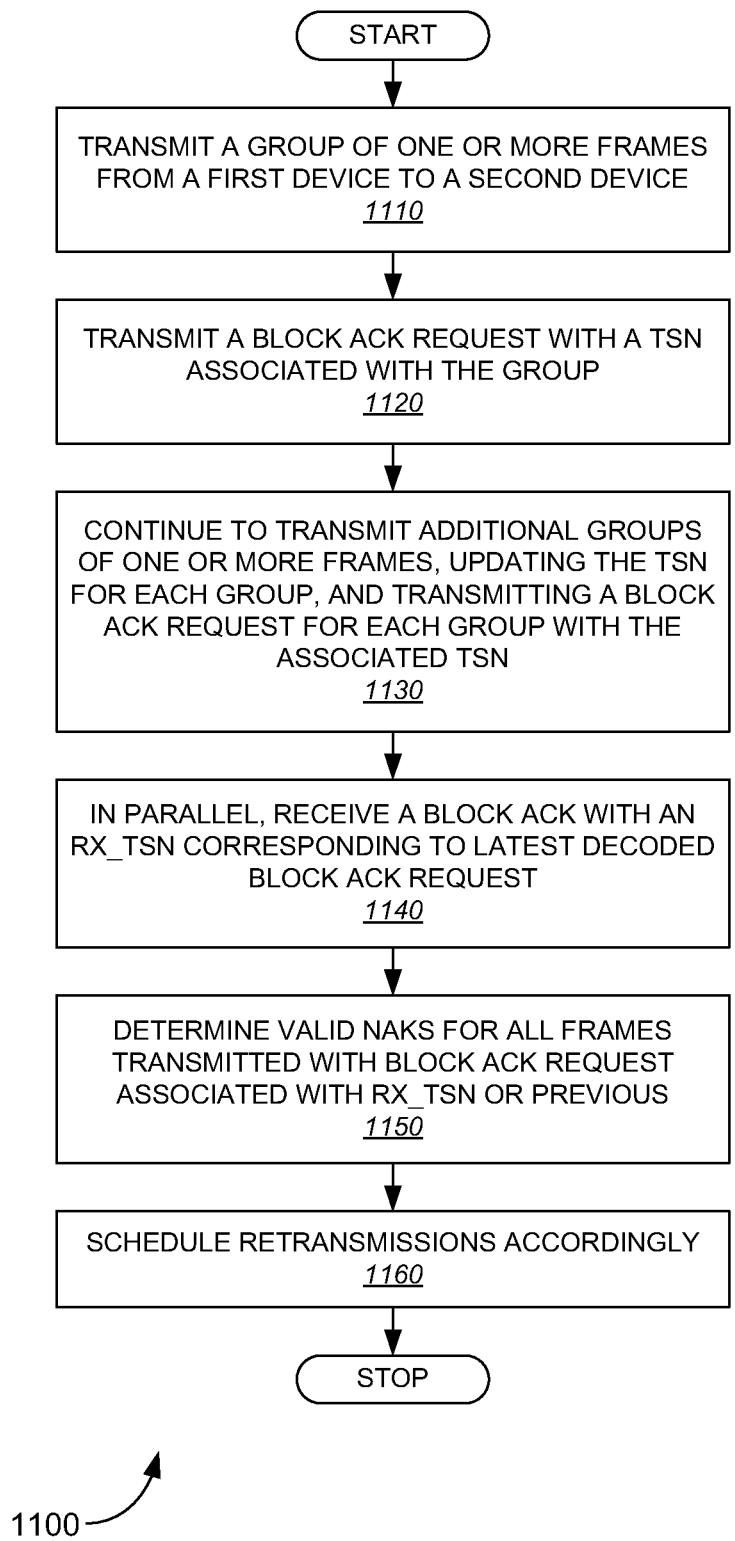
FIG. 11 depicts examplary embodiments of a method for determining acknowledgement in accordance with a transmit sequence number.

FIG. 11 depicts method 1100 for determining acknowledgement in accordance with a transmit sequence number. The process begins at 1110, where a first device transmits a group of one or more frames to a second device. At 1120, the first device transmits a BAR with a transmit sequence number associated with the transmitted group of frames. At 1130, the first device may continue to transmit additional groups of one or more frames, updating the transmit sequence number for each group and transmitting a BAR for each group with the associated transmit sequence number (for example, BA 800, depicted in FIG. 8, may have been received). At 1140, in parallel, the first device receives a BA from the second device with an indication of the TSN corresponding to or any previous TSN). At 1160, the first device may reschedule transmissions accordingly. Then the process may stop. Similar to method 600, method 1100 may be iterated indefinitely. the latest decoded BAR, labeled RX_TSN At 1150, the first device determines valid NAKs for all frames transmitted with the BAR associated with the transmit sequence number indicated by RX_TSN.

Various methods may be deployed for generating TSNs and RX TSNs, as will be apparent to one of skill in the art in light of the teaching herein. For example, a TSN may be initialized to any value, and incremented to produce subsequent TSN values (alternate techniques may also be deployed). At the receiver, RX_TSN may be initialized to an undefined value. On receipt of a BAR, RX_TSN may be set equal to the TSN in the received BAR. In one embodiment, this updating is performed only after decoding all frames received prior to the BAR. As appropriate, the current value of RX_TSN may be included in the BA, as detailed further below.

Figure 12:
FIGS. 12-13 depict illustrations of aspects of transmitted frames, Block Acks, corresponding NAKs, and TSNs.

Method 1100 may be further understood in light of an example. FIG. 12 depicts a sequence of transmitted frames 1200, which is similar to the sequence 700 depicted in FIG. 7. In this case however, the transmitted frames are associated with an indicated transmit sequence number, as shown. An "X" indicates the frame has not yet been transmitted. Thus, at time zero, frames 0-3 are transmitted with TSN set to zero. At time 1, frames 4-7 are transmitted with TSN set to one. At time 2, with the similar assumption as before (that frames 0 and 2 have been previously NAKed while frames 1 and 3 have been acknowledged at time 2), frames 0, 2, 8, and 9 are transmitted. Note that frames 1 and 3 have been affirmatively acknowledged, and thus they may be removed from the transmitter queue. This is indicated in FIG. 12 by graying out the associated frames.

Figure 13:

FIG. 13 depicts a BA 1300 with a BA bitmap as shown in the second row, each value associated with the corresponding frame sequence number identified in the first row. As shown, rows 3 and 4 correspond to two example scenarios in which the BA shown in row 2 is transmitted with a corresponding RX_TSN of one, and the result of the same BA transmitted within RX_TSN set to two, respectively. When the BA corresponds to TSN=1, it is clear that the BA is responding to the BAR associated with the frames transmitted with TSN set to one. Recall from FIG. 12 that frames 4-7 were transmitted with this TSN and thus, as shown, frames 4 and 5 were acknowledged and frames 6 and 7 were not acknowledged. Given that this BA is associated with TSN=1, the zeroes corresponding to frames 6 and 7 are valid and are indicated as NAK in row 3. The frames transmitted subsequently to TSN=1 are still in transit and thus, in this example, it is not yet clear whether frames 0, 2, 8, and 9 should be NAKed or are in transit. Thus, only frames 6 and 7 will be scheduled for re-transmission at this time.

In an alternate example, row 4 illustrates the result when the BA shown in row 2 is transmitted with an RX_TSN set to 2. In this case, since all the outstanding frames transmitted have been transmitted with a TSN=2 or earlier, all of the non-acknowledged frames will have had sufficient time for decoding as indicated by the RX_TXN. Thus, frames 0, 2, 6, 7, 8, and 9 are valid NAKs, and may be scheduled for re-transmission.

This Method 1100 permits operation with variable decoding delays, as described above. This embodiment requires that a BAR Transmit Sequence Number (TSN) field be included in the BAR frame and that the receiver include the most recently decoded value of the TSN in the BA frame response.

Figure 14:
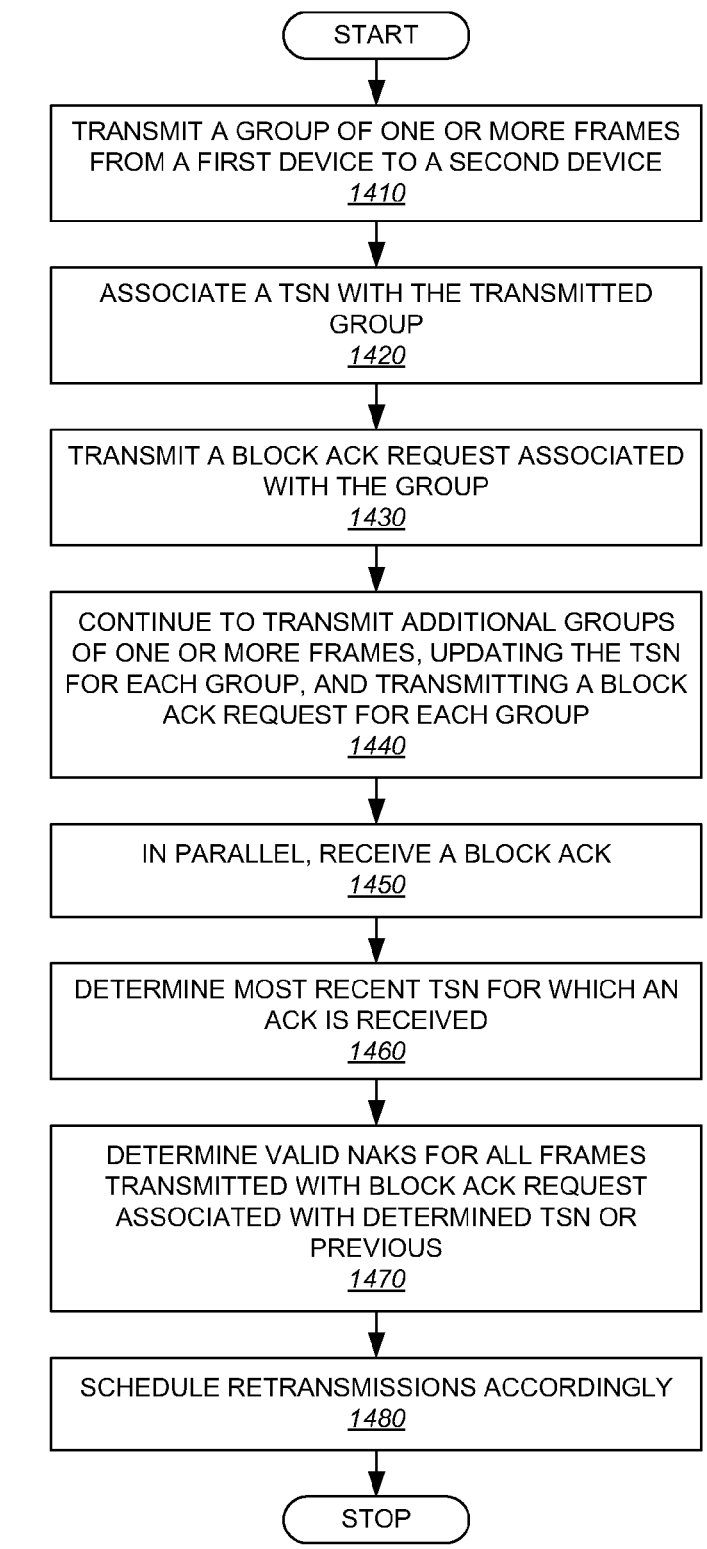
FIG. 14 depicts examplary embodiments of a method for determining re-transmission using a TSN, without the need to transmit the TSN in either the BAR or the BA.

In an alternate embodiment, variable decoding delay may be accommodated without the need to transmit the TSN, as described with respect to Method 1100. FIG. 14 depicts an example embodiment of a method 1400 for determining re-transmission using a TSN, without the need to transmit the TSN in either the BAR or the BA. At 1410, a group of one or more frames is transmitted from a first device to a second device. At 1420, associate a transmit sequence number with the transmitted group. At 1430, transmit a BAR associated with the group. Note that, in contrast to 1120, described above, the TSN is not transmitted. At 1440, subsequent to the transmission of the BAR, as before, the transmitting station may continue to transmit additional groups of one or more frames, updating the transmit sequence number for each group (and associating that TSN with the transmitted group), and transmitting a BAR for each group. Again, the TSN need not be transmitted. At 1450, in parallel, the first device receives a BA transmitted from the second device. At 1460, determine the most recent TSN for which an ACK is received. At 1470, determine valid NAKs for all frames transmitted with BAR associated with the determined TSN (or a previous TSN). In an alternate embodiment, useful when frames are generally transmitted sequentially, the highest acknowledged FSN may be located, and earlier FSNs may be marked as validly acknowledged. However, in this alternate embodiment, when a lower FSN has been retransmitted, perhaps subsequently to the highest ACKed FSN, unnecessary retransmissions of those lower FSN frames may be scheduled, if those frames are still in transit. At 1480, schedule re-transmissions in accordance with the NAKs determined above. Then the process may stop. As before, the process may iterate indefinitely.

Figure 15:
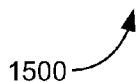
FIGS. 15-17 illustrates a set of transmissions, Block Acks, corresponding NAKs, and TSNs, which serve as examples for illustrating the method of FIG. 14.

Method 1400 may be clarified by way of an example. FIG. 15 illustrates a set of transmissions 1500, which serve as examples for illustrating Method 1400. As in FIG. 12, at time zero, frames 0-3 are transmitted with TSN set to zero. At time 1, frames 4-7 are transmitted with TSN set to one. As before, assume that a block acknowledgement is received for frames 0-3, with frames 1 and 3 being ACKed (thus, they may be removed from the transmitter queue, as indicated by graying out these frames in FIG. 15) and frames 2 and 4 being NAKed. Then, at time 2, frames 0, 2 are retransmitted and frame 8 is transmitted along with them (note that in all the examples above, various other traffic may be transmitted to other stations or with alternate access classes in aggregate or separate such as described in the '330 application referenced above. At time 3, frames 9, 10, and 11 are transmitted. At time 4, frames 2, 12, 13, and 14 are transmitted with TSN=4.

Figure 16:
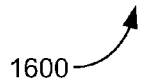

In this embodiment, transmission of the TSN may be omitted. Associating the TSN only at the transmitter still allows for expedited NAK recognition. As detailed above, in one embodiment, find the most recent TSN for which an ACK is received, then all NAKs for previously transmitted frames (i.e. frames from previous TSNs) must be valid. In a first example, consider the BA 1600 depicted in FIG. 16. Here, a BA is received subsequent to the transmission of the frames at time 4 described above. Because there can be re-transmissions of lower numbered frames subsequent to the transmission of higher numbered frames, it is not sufficient to merely find the highest frame sequence number that is ACKed and determine that lower numbers are NAKed. (Furthermore, in any given embodiment, it may not be a requirement that the transmit buffer is transmitted in sequence, although in certain embodiments this will be the case.) To illustrate, note the circled acknowledgement for FSN 2 in this example. It is determined that FSN 2 is acknowledged. Note that FSN 2 was last transmitted in a group associated with TSN set to 4 (frame 2 was also transmitted earlier, with TSN set to zero, but was validly NAKed, as described previously). Thus, the BA is responsive to the BAR containing frame 2, and thus all other ACKs or NAKs corresponding to the group associated with TSN=4 are also valid. These include frames 12, 13, and 14. Thus, as shown in row 3 of FIG. 16, frames 12-14, which did not have an ACK indicated in the BA bitmap shown in row 2, are valid NAKs. Furthermore, all previously transmitted frames associated with prior TSNs must have also been decoded as well. Thus, the NAKs for frames 0 and 6-11 are also valid and are indicated as NAKs in the third row. In this example, ACKs are not indicated in row 3. Recall that acknowledged frames may be removed from the transmit buffer. Question marks are indicated for frames 15–(N−1). Had additional frames been transmitted (i.e. frames 15 and above), then they would be determined to be "in transit" since the most recently acknowledged frame in this example was frame 2.

Figure 17:
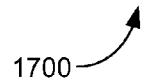

In an alternate example 1700, depicted in FIG. 17, assume the identical sequence of transmissions illustrated in FIG. 15 transpire. In this case, however, BA 1700 is changed as shown. In contrast to FIG. 16, FSN 2 contains a zero in the BA bitmap, and FSN 0 has a 1, indicating an ACK. In this case, by sequencing through the acknowledged frames, it is determined that the most recently transmitted acknowledged frame is frame zero, which was transmitted with TSN=2. Thus, the NAK associated with frame 8 is valid, since it was incorporated in the same group as frame zero, as well as previously transmitted frames, including frames 6 and 7. The rest of the frames are acknowledged, as indicated by blanks in row 3, or unknown and "in transmit" as indicated by question marks.

Figure 18:
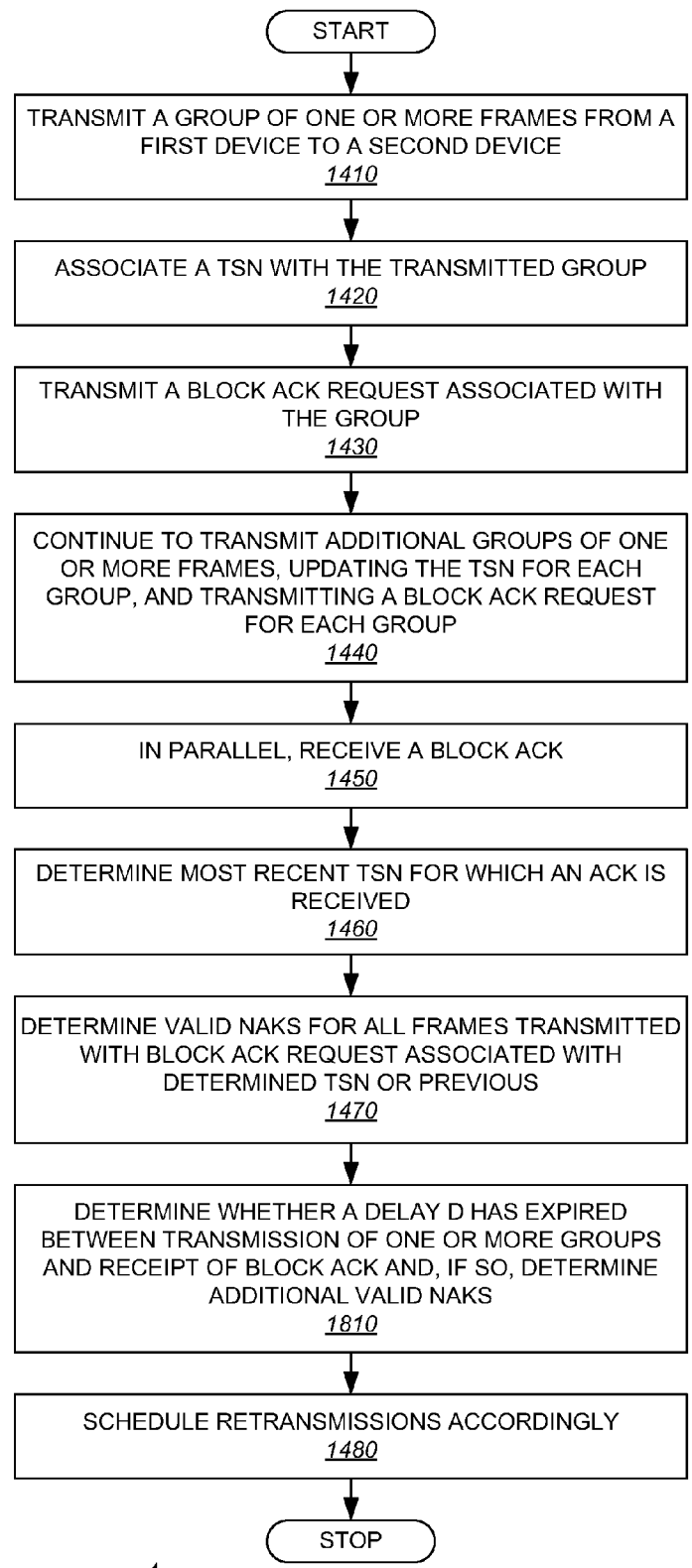
FIG. 18 depicts alternate embodiments of an enhanced Block Ack method combining a delay feature with an implicit TSN process.

FIG. 18 depicts an alternate embodiment of an enhanced BA method 1800 combining a delay feature, such as described above with respect to FIG. 6, with an implicit TSN process, such as described above with respect to FIG. 14. In this embodiment, if a BA bitmap is received with a large number of NAKs, and no ACK to indicate a validly received TSN, then a delay may be used to determine possible valid NAKs for earlier frames. Recall that, with the implicit TSN process described above, the presence of an ACK identifies an associated TSN with which to determine at least one of the BARs has been addressed. Additionally, frames transmitted subsequent to an identified TSN may also be determined to have been validly NAKed if the appropriate delay has transpired.

As before, note that the delay may be set small to keep from unnecessarily re-transmitting while keeping a latency of retransmit down in such circumstances. If a larger delay is desired, the likelihood of falsely identifying a NAK may be reduced, but latency of re-transmission of NAKed frames may be increased. Those of skill in the art will readily determine the appropriate delay to deploy in various embodiments.

The process of method 1800 begins at 1410 and proceeds to 1470 using steps similar to those described above with respect to FIG. 14. Note that, in contrast to FIG. 14, block 1470 is followed by an additional block 1810. At 1810, determine whether a delay, D, has expired between transmission of one or more groups and receipt of the BA. If so, determine possible additional valid NAKs. The process continues on to 1480, as described above.

The example given above with respect to FIG. 17 may be used to illustrate this additional feature as well. In this example, recall that the acknowledgement of frame zero allowed the transmitter receiving the BA to determine that the BA was responsive to at least TSN=2. Using the enhancement described with respect to FIG. 18, if the time expired between TSN=3 and the receipt of the BA shown in FIG. 17 is sufficient, then the transmitter may assume that the BA is also responsive to frames transmitted with respect to TSN=3. In which case, the transmitter may determine that frames 9, 10, and 11 are also NAKed, and should be rescheduled for transmission. In this example, assume that the delay is not long enough to make a determination about TSN=4, and thus the corresponding validity of the NAK associated with frames 2, 12, 13, and 14. This illustration serves as an example only.

Figure 19:
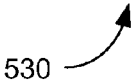
FIG. 19 depicts examplary embodiments of a transmitter queue.

FIG. 19 depicts an example embodiment of a transmitter queue 1900, suitable for deployment in memory 530. Those of skill in the art will recognize that any type of queue may be deployed for a transmitter queue. In this example, the transmitter queue comprises frames for transmission 1930A-N associated with respective frame sequence numbers 1910A-N. In an embodiment deploying a delay method only, such as depicted in FIG. 6, note that TSN (1920A-N) need not be deployed. When a TSN is desired, the TSN may be associated with each frame transmission. Note that, as described above, additional fields may be deployed, and/or values for the fields shown may be used, to indicate a frame should be retransmitted, deleted, etc., as will be readily apparent to those of skill in the art.

A similar receiver queue may be deployed in a receiving device as well (details not shown). In a receiver queue, frames may be stored by FSN and delivered in order to a higher layer or application. Or, frames may be delivered out of order a destination or higher layer protocol (thus removing the need for a queue, reducing the storage requirements of the queue, or relocating the queue to a different component or circuit). Higher layers or applications may determine appropriate behavior for lost packets (i.e. the window in a BAR has moved forward, the transmitter has timed out or reached a maximum number of retries for a frame). This may occur when lossy algorithms are allowed (or the higher layer or other application has additional retransmission protocols for lost frames) and/or the data flow is latency sensitive.

Figure 20:
FIG. 20 depicts examplary embodiments of a BAR frame.

FIG. 20 depicts an example embodiment of a BAR frame 2000, suitable for use in the various embodiments detailed herein. In this example, the fields are identical to the BAR frame 200, detailed above, with the exception of an additional field, TSN 2010, which has been described in detail above. Note that, in alternate embodiments, any transmit sequence indicator may be used in place of a TSN. Various alternate embodiments may include the fields shown, additional fields, or any subset thereof.

Figure 21:
FIG. 21 depicts examplary embodiments of a BA frame.

FIG. 21 depicts an example embodiment of a BA frame 2100, suitable for use in the various embodiments detailed herein. In this example, the fields are identical to the BAR frame 300, detailed above, with the exception of an additional field, RX_TSN 2110, which has been described in detail above. Various alternate embodiments may include the fields shown, additional fields, or any subset thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising: receiving a plurality of frames for transmission to a remote device;
    associating a frame sequence identifier with each of the plurality of frames, each frame sequence identifier being different for each of the plurality of frames;
        generating a plurality of transmit sequence indicators, each transmit sequence indicator associated with one of a plurality of blocks, each block comprising two or more of the frames for transmission to the remote device;
        transmitting at least one block and at least one block acknowledgement request, the block acknowledgement request having the transmit sequence indicator of a transmitted block; and
        receiving a block acknowledgement from the remote device, the block acknowledgement including at least one of the transmit sequence indicators, indicating receipt of each of the frames associated with the transmitted blocks.

2. The method of claim 1, further comprising transmitting a transmit sequence indicator to the remote device.

3. The method of claim 1, further comprising storing a transmit sequence indicator in a transmit queue.

4. The method of claim 1, wherein the transmit sequence indicator determined is the most recently transmitted transmit sequence indicator for which an associated frame is acknowledged.

5. The method of claim 4, further comprising marking as not acknowledged all frames associated with the determined transmit sequence indicator or previously transmitted transmit sequence indicators for which the frame is not acknowledged in the block acknowledgement.

6. The method of claim 1, wherein the block acknowledgement indicates the transmit sequence indicator associated with the latest received frame to which the block acknowledgement applies.

7. The method of claim 6, further comprising marking as not acknowledged all of the non-acknowledged frames in a block acknowledgement associated with the indicated transmit sequence indicator, and any previously transmitted transmit sequence indicators.

8. The method of claim 1, wherein the block acknowledgement comprises a bit field, each bit in the bit field indicating the success of decoding of an associated frame.

9. The method of claim 1, further comprising marking a non-acknowledged frame for retransmission.

10. The method of claim 1, further comprising removing an acknowledged frame from a transmit queue.

11. The method of claim 1, wherein the block acknowledgement request is implied by transmitting a transmit sequence indicator subsequent to a transmitted frame.

12. The method of claim 1, further comprising transmitting two or more of the plurality of blocks to the remote device.

13. The method of claim 12, further comprising transmitting two or more block acknowledgement requests, each block acknowledgment request transmitted in conjunction with respective transmitted blocks.

14. The method of claim 13, further comprising receiving a single block acknowledgement responsive to two or more of the plurality of transmitted blocks.

15. An apparatus comprising:
    means for storing a plurality of frames for transmission to a remote station;
    means for storing a frame sequence identifier for each of the plurality of frames for transmission to a remote station, each frame sequence identifier being different for each of the plurality of frames; and
    means for storing a plurality of transmit sequence indicators for each of the plurality of frames for transmission to a remote station with a block acknowledgement request;
    means for storing at least one block acknowledgement request, the block acknowledgement request having the transmit sequence indicator of a transmitted block; and
    means for storing a received block acknowledgement from the remote device, the block acknowledgement including at least one of the transmit sequence indicators, indicating receipt of each of the frames associated with the transmitted blocks.

16. An apparatus comprising:
a memory comprising an input and an output, the input configured to receive a plurality of frames for transmission to a remote device; and
a processor, coupled with the memory, configured to:
associate a flame sequence identifier with each flame of the plurality of frames, each flame sequence identifier being different for each of the plurality of frames;
generate a plurality of transmit sequence indicators, each transmit sequence indicator associated with one of a plurality of blocks, each block comprising two or more of the frames for transmission to the remote device;
generate a block acknowledgement request including the transmit sequence indicator, the block acknowledgement request having the transmit sequence indicator of a transmitted block; and
receive a block acknowledgement from the remote device, the block acknowledgement including at least one of the transmit sequence indicators, indicating receipt of each of the frames associated with the transmitted blocks.

17. The apparatus of claim 16, further comprising a transmitter including a transmitter input and a transmitter output, the transmitter input coupled to the memory, one or more frames from the output of the memory transmitted on the transmitter output.

18. The apparatus of claim 16, further comprising a message generator including a message generator input and a message generator output, the message generator input coupled to the processor, a message delivered on the message generator output, and wherein the transmitter input is further coupled to the message generator output, the message of the message generator output transmitted on the transmitter output.

19. The apparatus of claim 16, further comprising a receiver including a receiver input and a receiver output, receiving a message on the receiver input, the receiver output coupled to the processor.

20. The apparatus of claim 19, wherein the processor is further configured to process a received block acknowledgement in accordance with a received transmit sequence indicator.

21. An apparatus comprising:
means for receiving a plurality of frames for transmission to a remote device;
means for associating a frame sequence identifier with each of the plurality of frames, each frame sequence identifier being different for each of the plurality of frames;
means for generating a plurality of transmit sequence indicators, each transmit sequence indicator associated with one of a plurality of blocks, each block comprising two or more of the frames for transmission to the remote device; and
means for transmitting at least one block and at least one block acknowledgement request, the block acknowledgement request having the transmit sequence indicator of a transmitted block; and
means for receiving a block acknowledgement from the remote device, the block acknowledgement including at least one of the transmit sequence indicators, indicating receipt of each of the frames associated with the transmitted blocks.

22. The method of claim 21, further comprising means for storing a transmit sequence indicator in a transmitter queue.

23. An apparatus comprising:
a receiver having a receiver input and a receiver output, the receiver receiving:
a first plurality of frames, each of the plurality of frames being associated with a frame sequence identifier, each frame sequence identifier being different for each of the plurality of frames;
a first transmit sequence indicator associated with the first plurality of frames on the receiver input; and
a block acknowledgement request from a remote device, the block acknowledgement request including at least one transmit sequence indicator associated with a plurality of transmitted blocks, each block comprising two or more frames;
a decoder having a decoder input coupled to the receiver output and a decoder output;
a message generator having a message generator input coupled to the decoder output and a message generator output, a message comprising the received first transmit sequence indicator and a block acknowledgment of the first plurality of frames, indicating receipt of each of the frames associated with the transmitted blocks, in accordance with the decoder output delivered on the message generator output; and
a transmitter having a transmitter input coupled to the message generator output and a transmitter output, the message of the message generator output transmitted on the transmitter output.

24. The apparatus of claim 23, wherein one or more of the plurality of frames are aggregated into one or more aggregated frames.

25. The apparatus of claim 23, wherein the receiver further receives one or more previous transmit sequence indicators and one or more associated previous pluralities of frames, and wherein the message comprises block acknowledgment of the previous pluralities of frames in addition to the first plurality of frames.

26. A method comprising:
receiving from a remote station:
a plurality of frames, each of the plurality of frames being associated with a frame sequence identifier, each frame sequence identifier being different for each of the plurality of frames; and
a transmit sequence indicator associated with a plurality of received blocks, each block comprising two or more of the received plurality of frames;
decoding the plurality of frames;
determining a positive or negative acknowledgement for each of the plurality of frames in response to a block acknowledgement request having at least one transmit sequence indicator associated with the transmitted blocks;
generating a message comprising the determined positive or negative acknowledgment for each of the plurality of frames and the transmit sequence indicator associated with the received plurality of frames; and
transmitting the message to the remote station.

27. The method of claim 26, wherein the transmit sequence indicator is included in the block acknowledgement request.

28. The method of claim 26, wherein the block acknowledgement request is implicit in receiving a transmit sequence indicator subsequent to a received frame.

29. The method of claim 26, wherein the message comprises a bit field, each bit in the bit field indicating the positive or negative acknowledgement for each of the plurality of frames.

30. An apparatus comprising:
a receiver receiving:
one or more pluralities of frames, each of the frames of the one or more pluralities of frames being associated with a frame sequence identifier, each frame sequence identifier being different for each of the plurality of frames, wherein the pluralities of frames are grouped in blocks, each block having a transmit sequence indicator and comprising two or more frames: and at least one block and at least one block acknowledgement request having one or more associated transmit sequence indicators;

a transmitter transmitting a block acknowledging message; and means for generating the block acknowledging message comprising the positive or negative acknowledgement for at least one of the one or more pluralities of frames and the transmit sequence indicator associated with the latest received plurality of frames for which positive or negative acknowledgment is provided in the block acknowledgement message.

31. Computer readable media operable to perform the following steps:

receiving a plurality of frames for transmission to a remote device;

associating a frame sequence identifier with each of the plurality of frames, each frame sequence identifier being different for each of the plurality of frames;

generating a plurality of transmit sequence indicators, each transmit sequence indicator associated with one of a plurality of blocks, each block comprising two or more of the frames for transmission to the remote device;

transmitting at least one block and at least one block acknowledgement request, the block acknowledgement request having the transmit sequence indicator of a transmitted block; and receiving a block acknowledgement from the remote device, the block acknowledgement including at least one of the transmit sequence indicators, indicating receipt of each of the frames associated with the transmitted blocks.

32. Computer readable media operable to perform the following steps:

receiving from a remote station:

a plurality of frames, each of the plurality of frames being associated with a frame sequence identifier, each frame sequence identifier being different for each of the plurality of frames; and a block acknowledgement request having at least one transmit sequence indicator associated with a received plurality of blocks, each block comprising two or more of the received plurality of frames;

decoding the plurality of frames;

determining a positive or negative acknowledgement for each of the plurality of frames;

generating a message comprising the determined positive or negative block acknowledgment for each for each of the plurality of frames and the transmit sequence indicator associated with the received plurality of frames; and transmitting the message to the remote station.

* * * * *